(12) United States Patent
Marinho et al.

(10) Patent No.: US 8,658,326 B2
(45) Date of Patent: *Feb. 25, 2014

(54) HEAT TRANSFER SYSTEM, FLUID, AND METHOD

(75) Inventors: Filipe J. Marinho, Danbury, CT (US); Bo Yang, Ridgefield, CT (US)

(73) Assignee: Prestone Products Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,358

(22) Filed: Mar. 29, 2012

(65) Prior Publication Data

US 2012/0270129 A1 Oct. 25, 2012

Related U.S. Application Data

(63) Continuation-in-part of application No. 12/500,036, filed on Jul. 9, 2009, now abandoned, which is a continuation-in-part of application No. 11/222,024, filed on Sep. 8, 2005, now Pat. No. 7,662,304.

(60) Provisional application No. 60/607,898, filed on Sep. 8, 2004, provisional application No. 61/080,033, filed on Jul. 11, 2008.

(51) Int. Cl.
*H01M 8/04* (2006.01)
*C09K 5/10* (2006.01)
*C09K 5/08* (2006.01)
*C09K 5/14* (2006.01)

(52) U.S. Cl.
USPC ...... 429/434; 136/246; 136/259; 165/104.19; 252/717; 252/73; 252/77; 252/78.1; 252/78.3; 429/120

(58) Field of Classification Search
USPC ............ 106/14.05, 4.12, 14.41, 14.42, 14.44; 165/104.19, 177, 108; 210/697; 252/70, 71, 73, 74, 75, 76, 77, 78.1, 252/78.3, 78.5, 175, 181, 389.2; 422/15; 429/26, 120, 434; 136/246, 259
See application file for complete search history.

(56) References Cited

U.S. PATENT DOCUMENTS 3,121,692 A 2/1964 Morehouse et al.
3,216,948 A 11/1965 Redding (Continued)

FOREIGN PATENT DOCUMENTS

CA 2344856 A1 3/2000
CA 2430443 A1 7/2002

(Continued)

OTHER PUBLICATIONS

Hungarian Patent No. 618051; Equivalent to 209546; Publication Date: Mar. 1, 1993; Abstract Only; 3 Pages.

(Continued)

*Primary Examiner* — Bijan Ahvazi
(74) *Attorney, Agent, or Firm* — Brian R. Dorn; Barnes & Thornburg LLP

(57) ABSTRACT

Disclosed herein is a heat transfer system comprising a circulation loop defining a flow path for a heat transfer fluid, and a heat transfer fluid comprising a liquid coolant, a siloxane corrosion inhibitor of formula R3-Si—[O—Si(R)2]x-OSiR3, wherein R is independently an alkyl group or a polyalkylene oxide copolymer of 1 to 200 carbons, x is from 0 to 100, and further wherein at least one alkyl group and at least one polyalkylene oxide copolymer are present, and a non-conductive polydiorganosiloxane antifoam agent, wherein the conductivity of the heat transfer fluid is less than about 100 μS/cm, and wherein the heat transfer system comprises aluminum, magnesium, or a combination thereof, in intimate contact with the heat transfer fluid.

18 Claims, 1 Drawing Sheet

(56) References Cited

U.S. PATENT DOCUMENTS

| | | |
|---|---|---|
| 3,312,622 A | 4/1967 | Pines et al. |
| 3,507,702 A | 4/1970 | Sanderson |
| 3,960,740 A | 6/1976 | Truett |
| 3,964,930 A | 6/1976 | Reiser |
| 4,284,729 A | 8/1981 | Cross et al. |
| 4,402,847 A | 9/1983 | Wilson et al. |
| 4,485,025 A | 11/1984 | Darden |
| 4,514,427 A | 4/1985 | Mitchell et al. |
| 4,584,125 A | 4/1986 | Griswold et al. |
| 4,588,513 A | 5/1986 | Triebel et al. |
| 4,648,883 A | 3/1987 | Podder |
| 4,762,167 A * | 8/1988 | Dobson ............... 165/11.1 |
| 5,200,278 A | 4/1993 | Watkins et al. |
| 5,723,060 A | 3/1998 | Bruhnke et al. |
| 5,725,794 A | 3/1998 | Bruhnke et al. |
| 5,776,624 A | 7/1998 | Neutzler |
| 5,804,063 A | 9/1998 | Creeron et al. |
| 5,914,362 A * | 6/1999 | Brecht et al. ............ 524/268 |
| 6,090,767 A * | 7/2000 | Jackson et al. ............ 510/242 |
| 6,203,719 B1 | 3/2001 | Turcotte et al. |
| 6,228,283 B1 | 5/2001 | Turcotte et al. |
| 6,486,248 B2 | 11/2002 | Ashley et al. |
| 6,528,564 B1 | 3/2003 | Xia |
| 6,605,126 B1 | 8/2003 | Xia et al. |
| 6,663,993 B2 | 12/2003 | Imaseki et al. |
| 6,673,482 B2 | 1/2004 | Imazeki et al. |
| 6,709,779 B2 | 3/2004 | Uozumi |
| 6,887,597 B1 | 5/2005 | Yang et al. |
| 7,371,334 B2 | 5/2008 | Wenderoth et al. |
| 7,418,617 B2 | 8/2008 | Hsieh et al. |
| 7,419,618 B2 | 9/2008 | Wenderoth et al. |
| 7,481,948 B2 | 1/2009 | Jeffcoate et al. |
| 2001/0050191 A1 | 12/2001 | Ogawa et al. |
| 2002/0031693 A1 | 3/2002 | Ishikawa |
| 2002/0063088 A1 | 5/2002 | Hidaka et al. |
| 2002/0076591 A1 | 6/2002 | Imaseki et al. |
| 2003/0071242 A1* | 4/2003 | Evans et al. ............ 252/73 |
| 2003/0072981 A1 | 4/2003 | Imaseki et al. |
| 2003/0198847 A1 | 10/2003 | Jeffcoate et al. |
| 2004/0001984 A1 | 1/2004 | Alva |
| 2004/0028963 A1 | 2/2004 | Kormann et al. |
| 2004/0028971 A1 | 2/2004 | Wenderoth et al. |
| 2004/0086757 A1 | 5/2004 | Mohapatra |
| 2004/0110050 A1 | 6/2004 | Abd Elhamid et al. |
| 2004/0129920 A1 | 7/2004 | Wenderoth et al. |
| 2005/0012069 A1 | 1/2005 | Maes et al. |
| 2005/0269548 A1 | 12/2005 | Jeffcoate et al. |
| 2006/0049167 A1 | 3/2006 | Yang et al. |
| 2006/0051639 A1 | 3/2006 | Yang et al. |
| 2006/0054564 A1 | 3/2006 | Woyciesjes et al. |
| 2006/0063050 A1* | 3/2006 | Yang et al. ............ 429/26 |
| 2007/0075120 A1 | 4/2007 | Yang et al. |
| 2007/0152191 A1 | 7/2007 | Trahan et al. |
| 2008/0061269 A1 | 3/2008 | Evans et al. |
| 2009/0266519 A1 | 10/2009 | Marinho et al. |
| 2009/0294102 A1 | 12/2009 | Yang et al. |

FOREIGN PATENT DOCUMENTS

| | | | |
|---|---|---|---|
| CA | 2435593 A1 | 8/2002 | |
| CA | 2445792 A1 | 11/2002 | |
| CA | 2449208 A1 | 12/2002 | |
| EP | 0376126 A2 | 7/1990 | |
| EP | 1262535 A1 | 12/2002 | |
| EP | 1304367 A1 | 4/2003 | |
| EP | 1323677 A1 | 7/2003 | |
| EP | 1416563 A1 | 5/2004 | |
| EP | 1457542 A2 | 9/2004 | |
| HU | 209546 B | 7/1994 | |
| JP | 8185877 A | 7/1996 | |
| WO | 0017951 A1 | 3/2000 | |
| WO | WO 00/17951 * | 3/2000 | |
| WO | 0175999 A1 | 10/2001 | |
| WO | 02055630 A1 | 7/2002 | |
| WO | 02055759 A2 | 7/2002 | |
| WO | 02090462 A1 | 11/2002 | |
| WO | 02101848 A2 | 12/2002 | |
| WO | 03033616 A1 | 4/2003 | |
| WO | 03040046 A1 | 5/2003 | |
| WO | 03061044 A3 | 7/2003 | |
| WO | 03070854 A1 | 8/2003 | |
| WO | WO03070854 A1 * | 8/2003 | ............ C09K 5/10 |
| WO | 2004053015 A1 | 6/2004 | |

OTHER PUBLICATIONS

Rohm and Haas Ion Exchange Resins—Industrial Process, Amberlyst Ion Exchange resins, URL: http://web.archive.org/web/20040623050423/http://www.rohmhaas.com/ionexchange/IP/wba.htm, Retrieved Jun. 24, 2004, 1 Page.

Lange et al., Perfluoroalkylcarboxylates and -sulfonates Emerging Contaminants for Drinking Water Supplies?, Jun. 2006, 29 Pages.

Nelson, R., Dispersing Powders in Liquids, Part 3, Educ. Reso for Part. Techn. 032Q-Nelson, Copyright 2003, 12 Pages.

International Search Report; International Application No. PCT/US2005/031778; Filing Date: Sep. 8, 2005; Mailing Date: Dec. 29, 2005; 4 Pages.

Written Opinion of the International Searching Authority; International Application No. PCT/US2005/031778; Filing Date: Sep. 8, 2005; 8 Pages.

International Search Report; International Application No. PCT/US2005/031834; International Filing Date: Sep. 8, 2005; 4 Pages.

Written Opinion of the International Searching Authority; International Application No. PCT/US2005/031834; Filing Date: Sep. 8, 2005; 6 Pages.

International Search Report; International Application No. PCT/US2005/032173; Date of Filing: Sep. 8, 2005; Date of Mailing: Dec. 28, 2005; 3 Pages.

Written Opinion of the International Searching Authority; International Application No. PCT/US2005/032173; Filing Date: Sep. 8, 2005; 5 Pages.

International Search Report; International Application No. PCT/US2005/032174; Date of Mailing: Jul. 17, 2006; 3 Pages.

Written Opinion of the International Searching Authority; International Application No. PCT/US2005/032174; Filing Date: Sep. 8, 2005; 16 Pages.

International Search Report; International Application No. PCT/US2009/050257; Date of filing: Jul. 10, 2009; 4 Pages.

Written Opinion of the International Searching Authority; International Application No. PCT/US2009/050257; Date of Mailing: Feb. 17, 2010; 6 Pages.

Chemistry Gateway, Properties of Aqueous Acid-Base Indicators, 2004, 1 Page.

* cited by examiner

HEAT TRANSFER SYSTEM, FLUID, AND METHOD

This application is a continuation of U.S. patent application Ser. No. 12/500,036, filed on Jul. 9, 2009, which is a continuation-in-part of U.S. patent application Ser. No. 11/222,024, filed Sep. 8, 2005, which claims the benefit of U.S. Provisional Application No. 60/607,898, filed Sep. 8, 2004, all of which are incorporated by reference herein in their entirety. This application also claims the benefit of U.S. Provisional Application No. 61/080,033 filed on Jul. 11, 2008, which is incorporated by reference herein in its entirety.

BACKGROUND

This disclosure generally relates to a heat transfer system, heat transfer fluid, and heat transfer method.

The operation of a power source generates heat. A heat transfer system, in communication with the power source, regulates the generated heat, and ensure that the power source operates at an optimum temperature. The heat transfer system generally comprises a heat transfer fluid that facilitates absorbing and dissipating the heat from the power source. Heat transfer fluids, which generally comprise water and a glycol, are in intimate contact with one or several metallic parts that are prone to corrosion. Thus, several corrosion inhibitors are added to the heat transfer fluid in order to protect the metallic parts from corrosion. Traditional heat transfer fluids can exhibit extremely high conductivities, often in the range of 3000 microsiemens per centimeter ($\mu S$/cm) or more. This high conductivity produces adverse effects on the heat transfer system by promoting corrosion of metal parts, and also in the case of power sources where the heat transfer system is exposed to an electrical current, such as in fuels cells or the like, the high conductivity can lead to short circuiting of the electrical current and to electrical shock.

Aluminum, magnesium, and their alloys, are increasingly used in the manufacture of several components of a heat transfer system. They are advantageous due to their light weight, high strength, and relative ease of manufacture, among others. Aluminum, magnesium, and their alloys can be used in heat transfer systems of internal combustion engines and alternative power sources. However, magnesium, aluminum, and their alloys are highly susceptible to corrosion when in contact with traditional heat transfer fluids with high conductivity. In addition, the foaming of traditional heat transfer fluids further contributes to the corrosion of aluminum, magnesium, and their alloys.

Therefore, a need exists for heat transfer systems and fluids intended for use therein, wherein the heat transfer systems comprise aluminum, magnesium, or their alloys, in intimate contact with the heat transfer fluid. The heat transfer fluids advantageously have low conductivity and good foaming properties.

SUMMARY

The above-described and other drawbacks are alleviated by a heat transfer system, comprising a circulation loop defining a flow path for a heat transfer fluid, and a heat transfer fluid comprising a liquid coolant, a siloxane corrosion inhibitor of formula R3-Si—[O—Si(R)2]x-OSiR3, wherein R is independently an alkyl group or a polyalkylene oxide copolymer of 1 to 200 carbons, x is from 0 to 100, and further wherein at least one alkyl group and at least one polyalkylene oxide copolymer are present, and a non-conductive polydiorganosiloxane antifoam agent, wherein the conductivity of the heat transfer fluid is less than about 100 $\mu S$/cm, and wherein the heat transfer system comprises aluminum, magnesium, or a combination thereof, in intimate contact with the heat transfer fluid.

In one embodiment, a heat transfer fluid comprises a liquid coolant, a siloxane corrosion inhibitor of formula R3-Si—[O—Si(R)2]x-OSiR3, wherein R is independently an alkyl group or a polyalkylene oxide copolymer of 1 to 200 carbons, x is from 0 to 100, and further wherein at least one alkyl group and at least one polyalkylene oxide copolymer are present, and a non-conductive polydiorganosiloxane antifoam agent, wherein the conductivity of the heat transfer fluid is less than about 100 $\mu S$/cm.

In another embodiment, a heat transfer method comprises contacting a heat transfer system with a heat transfer fluid, wherein the heat transfer system comprises a circulation loop defining a flow path for the heat transfer fluid, and aluminum, magnesium, or a combination thereof, wherein the heat transfer fluid comprises a liquid coolant, a siloxane corrosion inhibitor of formula R3-Si—[O—Si(R)2]x-OSiR3, wherein R is independently an alkyl group or a polyalkylene oxide copolymer of 1 to 200 carbons, x is from 0 to 100, and further wherein at least one alkyl group and at least one polyalkylene oxide copolymer are present, and a non-conductive polydiorganosiloxane antifoam agent, wherein the conductivity of the heat transfer fluid is less than about 100 $\mu S$/cm, and wherein the aluminum, magnesium, or combination thereof is in intimate contact with the heat transfer fluid.

BRIEF DESCRIPTION OF THE DRAWINGS

Referring now to the drawings wherein like elements are numbered alike in several FIGURES.

DETAILED DESCRIPTION

Figure 1:
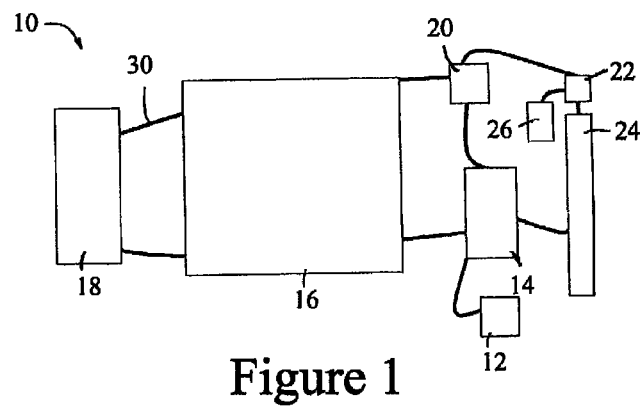
FIG. 1 is a schematic diagram of one embodiment of the heat transfer system.

Surprisingly, the present inventors have discovered that a heat transfer fluid comprising a liquid coolant, a siloxane corrosion inhibitor, and a non-conductive polydiorganosiloxane antifoam agent, is an effective low conductivity heat transfer fluid that is advantageous for use in heat transfer systems where the heat transfer fluid is in intimate contact with aluminum, magnesium, or their alloys, and/or with power sources where the heat transfer fluid is exposed to an electrical current. The conductivity of the heat transfer fluid is advantageously less than about 100 $\mu S$/cm. In one advantageous embodiment, the heat transfer fluid further comprises an azole.

As used herein, "aluminum" refers to aluminum metal, alloys thereof, or a combination thereof, and "magnesium" refers to magnesium metal, alloys thereof, or a combination thereof.

The liquid coolant comprises an alcohol, water, or a combination of an alcohol and water. It is advantageous to use deionized water, demineralized water, or a combination thereof, which generally exhibit a conductivity lower than that of water which has not been deionized or demineralized. The heat transfer fluid can be a concentrated heat transfer fluid, that is, a heat transfer fluid comprising a liquid coolant consisting essentially of alcohols. Concentrated heat transfer fluids are advantageous for storage and shipping. Concentrated heat transfer fluids can, if desired, be combined with water prior to or after use in the heat transfer system. The heat transfer fluid can, on the other hand, be a diluted heat transfer fluid, that is, a heat transfer fluid comprising alcohols and water. Both concentrated and diluted heat transfer fluids are suitable for use in the heat transfer system. In one embodiment, the heat transfer fluid comprises a concentrated heat transfer fluid. In another embodiment, the heat transfer fluid comprises a diluted heat transfer fluid.

Water can be present in the heat transfer fluid in an amount of about 0.01 to about 90 weight percent (wt %), based on the total weight of the heat transfer fluid. Specifically, water can be present in the heat transfer fluid in an amount of about 0.5 to about 70 wt %, and more specifically about 1 to about 60 wt %, based on the total weight of the heat transfer fluid. The heat transfer fluid can be free of water.

The alcohol comprises monohydric alcohols, polyhydric alcohols, or mixtures of monohydric and polyhydric alcohols. Non-limiting examples of monohydric alcohols include methanol, ethanol, propanol, butanol, furfurol, tetrahydrofurfurol, ethoxylated furfurol, alkoxy alkanols such as methoxyethanol, and the like, and combinations comprising at least one of the foregoing monohydric alcohols. Non-limiting examples of polyhydric alcohols include, ethylene glycol, diethylene glycol, triethylene glycol, 1,2-propylene glycol, 1,3-propylene glycol (or 1,3-propanediol), dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylol propane, and the like, and combinations comprising at least one of the foregoing polyhydric alcohols.

The alcohol can be present in the heat transfer fluid in an amount of about 10 to about 99.9 wt %, based on the total weight of the heat transfer fluid. Specifically, the alcohol can be present in the heat transfer fluid in an amount of about 30 to about 99.5 wt %, and more specifically about 40 to about 99 wt %, based on the total weight of the heat transfer fluid.

Siloxane corrosion inhibitors comprise polysiloxanes or organosilane compounds comprising a silicon-carbon bond, or combinations thereof. Suitable polysiloxanes are those of the formula $R_3$-Si—[O—Si(R)$_2$]$_x$-OSiR$_3$ wherein R is independently an alkyl group or a polyalkylene oxide copolymer of 1 to 200 carbons and x is from 0 to 100, more specifically 2 to 90, more specifically 3 to 80, more specifically 4 to 70, and even more specifically 5 to 60.

In one exemplary embodiment, the siloxane corrosion inhibitors comprise polysiloxanes or organosilane compounds comprising a silicon-carbon bond, or a combination thereof, and further comprising at least one group that is a polyalkylene oxide copolymer of one or more alkylene oxides having from 2 to 6 carbons, specifically from 2 to 4 carbons. In another exemplary embodiment, the siloxane corrosion inhibitor is of the formula $R_3$-Si—[O—Si(R)$_2$]$_x$-OSiR$_3$ wherein R is independently an alkyl group or a polyalkylene oxide copolymer of 1 to 200 carbons and x is as discussed above, and further wherein at least one alkyl group and at least one polyalkylene oxide copolymer.

Non-limiting examples of commercially available polysiloxanes for use herein include the SILWET siloxanes from GE Silicones/OSi Specialties, and other similar siloxane-polyether copolymers available from Dow Corning or other suppliers. In one exemplary embodiment, siloxane corrosion inhibitors comprise SILWET L-77, SILWET L-7657, SILWET L-7650, SILWET L-7600, SILWET L-7200, SILWET L-7210 or the like.

Organosilane compounds comprise a silicon-carbon bond capable of hydrolyzing in the presence of water to form a silanol, that is, a compound comprising silicon hydroxide. Organosilane compounds can be of the formula R'Si(OZ)$_3$ wherein R' and Z are independently an aromatic group, an alkyl group, a cycloalkyl group, an alkoxy group, or an alkenyl group, and can comprise a heteroatom such as N, O, or the like, in the form of functional groups such as amino groups, epoxy groups, or the like. In one embodiment, R' is an aromatic group, an alkyl group, a cycloalkyl group, an alkoxy group, or an alkenyl group, and can comprise a heteroatom such as N, O, or the like, in the form of functional groups such as amino groups, epoxy groups, or the like, and Z is a C1-C5 alkyl group.

Non-limiting examples of commercially available organosilane compounds for use herein include the SILQUEST and FORMASIL surfactants from GE Silicones/OSi Specialties, and other suppliers. In an exemplary embodiment, siloxane corrosion inhibitors comprise FORMASIL 891, FORMASIL 593, FORMASIL 433, SILQUEST Y-5560 (polyalkyleneoxidealkoxysilane), SILQUEST A-186 (2-(3, 4-epoxycyclohexyl)ethyltrimethoxysilane), SILQUEST A-187 (3-glycidoxypropyltrimethoxysilane), or other SILQUEST organosilane compounds available from GE Silicones, Osi Specialties or other suppliers and the like.

Non-limiting examples of other organosilane compounds for use herein include 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and those organosilane compounds having a structure similar to the foregoing, but varying numbers of carbon atoms.

The siloxane corrosion inhibitor can be present in the heat transfer fluid in an amount of about 0.01 to about 10 wt %, more specifically about 0.02 to about 2 wt %, based on the total weight of the heat transfer fluid.

The non-conductive polydiorganosiloxane antifoam agents comprise any polydiorganosiloxane antifoam agents. Specifically, the non-conductive polydiorganosiloxane antifoam agents are those where the terminal groups at the molecular chain are selected from a trimethylsilyl group, a dimethylhydroxysilyl group, and a combination thereof. In one exemplary embodiment, the polydiorganosiloxane is polydimethylsiloxane. These antifoam agents are effective at preventing the formation of foam in the heat transfer fluid and/or eliminating foam that formed in the heat transfer fluid. The polydiorganosiloxane antifoam agents are advantageously emulsion based antifoam agents In one exemplary embodiment, the polydimethylsiloxanes for use herein has the formula $(CH_3)_3SiO$—$(SiCH_3)_2O)_m$-$Si(CH_3)_3$, where m is from 1 to 30,000.

Specifically, the polydiorganosiloxanes have a kinematic viscosity of about 5 to about 100 million mm2/sec at 25° C. More specifically, the kinematic viscosity of the polydimethylsiloxanes is about 10 to about 1,000,000 mm2/sec at 25° C. and the average molecular weight is about 1000 to about 200,000 Daltons.

Polydiorganosiloxanes for use herein also include polydiethylsiloxanes, polydimethyl polydiphenyl siloxane copolymers, polydimethyl-poly(chloropropyl methyl)siloxanes, and a combination thereof.

Other polydiorganosiloxanes for use herein have the formula $(CH_3)_3SiO$-$(SiCH_3)_2O)_x$-$(CH_3GSiO)_y$-$Si(CH_3)_3$, wherein G comprises an alkyleneoxide or a polyoxyalkylene group. Non-limiting examples of G include oxyalkylene groups having the formula —$(CH_2)_z(OCH_2CH_2)_mOH$, —$(CH_2)_z(OCH_2CH_2CH_2)_mOH$, —$(CH_2)_zO(OCH_2CH_2)_mH$, —$(CH_2)_zO(OCH_2CH_2CH_2)_mH$, —$(CH_2)_z(OCH_2CH_2CH_2)_k(OCH_2CH_2)_lOH$, —$(CH_2)_zO$ (OCH2CH2CH2)k(OCH2CH2)lH, —(CH2)z(OCH2CH2)k[OCH2C(CH3)H]lOH, —(CH2)z(OCH2CH2)mOCH3, —(CH2)z(OCH2CH2)k[OCH2C(CH3)H]lOCH3, —(CH2)z(OCH2CH2)mOC(O)CH3, —(CH2)z(OCH2CH2)mOCH3, and —(CH2)z(OCH2CH2)k[OCH2C(CH3)H]lOC(O)CH3, wherein x is an integer of 1 to 700, y is an integer of 1 to 60, z is an integer of 2 to 15, and m, k and l are integers of 1 to 40. Mixture of the above-described polydiorganosiloxanes can also be used.

The polydiorganosiloxane antifoam agent can further comprise up to about 20 wt % of a finely divided filler. Non-limiting examples of the finely divided filler include fumed, precipated, and plasmatic TiO2, Al2O3, Al2O3/SiO2, ZrO2/SiO2, and SiO2. Hydrocarbon waxes, triglycerides, long chain fatty alcohols, fatty acid esters and finely divided polyolefin polymers, such as polypropylene, polyisobutylene, are additional examples of fillers for use herein. The finely divided filler can be hydrophilic or hydrophobic. The filler can be hydrophobed during manufacturing of the antifoam or independently. Various grades of silica having a particle size of several nanometers to several microns and a specific surface area of about 40 to about 1000 m2/g, more specifically a specific surface area of about 50 to about 400 m2/g, are commercially available and suitable for use as the filler in the polydiorganosiloxane based antifoams.

In one exemplary embodiment, hydrophobized silica having a specific surface area of about 50 to about 350 m2/g is used as the filler. Non-limiting examples of silica fillers for use herein include AEROSIL R 812, and R 812S from Evonik Degussa (Essen, Germany), TULLANOX 503 and 1080 from Tulco (MA, U.S.A.), and similar products from other suppliers.

The polydiorganosiloxane antifoam agent can further comprise up to 20 wt % of a hydrophobic oil. Non-limiting examples of the hydrophobic oil include mineral oil, hydrocarbon oils derived from carbonaceous sources, such as petroleum, shale, and coal, and equivalents thereof. Mineral oils include heavy white mineral oil which is high in paraffin content, light white mineral oil, petroleum oils such as aliphatic or wax-base oils, aromatic and asphalt-base oils, mixed-base oils, petroleum derived oils such as lubricants, engine oils, machine oils, and cutting oils, and medicinal oils such as refined paraffin oil. The mineral oils are available commercially from several suppliers, including, but not limited to, Exxon Company (Houston, Tex.), and Shell Chemical Company (Houston, Tex.). In one exemplary embodiment, the mineral oil has a dynamic viscosity of about 1 to about 20 centipoise ("cP", 1 cP=1 mPa·s) at 25° C.

The polydiorganosiloxane antifoam agent can further comprise other components, such as polyalkylenoxide, water, alkylene glycol, surfactants, antiseptic agents, and biocides, up to about 95 wt %.

Non-limiting examples of commercially available non-conductive polydimethylsiloxane based antifoam agents and emulsions thereof include PC-5450NF from Performance Chemicals LLC, XD-55 and XD-56 from CNC International, and Y-14865 from Momentive Performance Materials.

The non-conductive polydiorganosiloxane antifoam agent can be present in the heat transfer fluid in an amount of about 1 to about 3000 parts per million (ppm), specifically about 100 to about 2000 ppm, more specifically about 200 to about 1000 ppm, based on the total weight of the heat transfer fluid.

In one advantageous embodiment, the heat transfer fluid further comprises an azole. Azoles for use herein include five-membered heterocyclic compounds having 1 to 4 nitrogen atoms as part of the heterocycle. Non-limiting examples of azoles include pyrroles, pyrazoles, imidazoles, triazoles, thiazoles and tetrazoles according to formulas (I)-(IV):

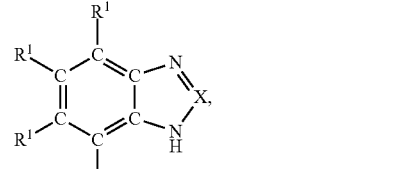

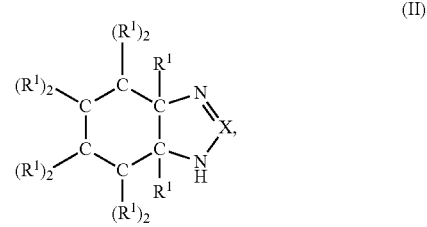

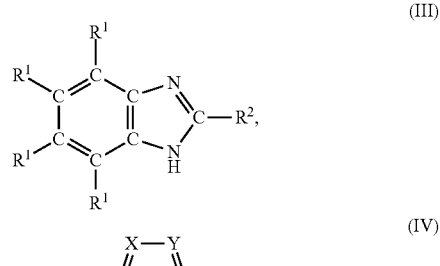

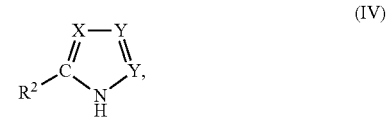

wherein $R^1$ and $R^2$ are independently a hydrogen atom, a halogen atom such, a $C_{1-20}$ alkyl or cycloalkyl group, $SR^3$, $OR^3$, or $NR^3_2$, wherein $R^3$ is independently a hydrogen atom, a halogen atom, or a $C_{1-20}$ alkyl or cycloalkyl group, X is independently N or $CR^2$, and Y is independently N or $CR^1$.

Non-limiting examples of azoles include pyrrole, methylpyrrole, pyrazole, dimethylpyrazole, benzotriazole, tolyltriazole, methyl benzotriazole such as 4-methyl benzotriazole and 5-methyl benzotriazole, butyl benzotriazole, mercaptobenzothiazole, benzimidazole, halo-benzotriazole such as chloro-methylbenzotriazole, tetrazole, methyl tetrazole, mercapto tetrazole, thiazole, 2-mercaptobenzothiazole and the like. In one embodiment, the azole comprises benzotriazole, tolyltriazole, mercaptobenzothiazole, or a combination thereof. In one exemplary embodiment, the azole comprises benzotriazole. In another exemplary embodiment, the azole comprises tolyltriazole.

The azole can be present in the heat transfer fluid in an amount of 0.0001 to about 10 wt %, specifically about 0.01 to about 8 wt %, more specifically about 0.5 to about 4 wt %, based on the total weight of the heat transfer fluid.

The heat transfer fluid can further comprise additional corrosion inhibitors that are non-ionic. Non-limiting examples of these additional corrosion inhibitors include fatty acid esters, such as sorbitan fatty acid esters, polyalkylene glycols, polyalkylene glycol esters, copolymers of ethylene oxide and propylene oxide, polyoxyalkylene derivatives of sorbitan fatty acid esters, or the like, or combinations thereof. The average molecular weight of additional corrosion inhibitors is from about 55 to about 300,000 daltons, and more specifically from about 110 to about 10,000 daltons. Non-limiting examples of sorbitan fatty acid esters include sorbitan monolaureates such as SPAN 20, ARLACEL 20, or S-MAZ 20M1, sorbitan monopalmitates such as SPAN 40 or ARLACEL 40, sorbitan monostearates such as SPAN 60, ARLACEL 60, or S-MAZ 60K, sorbitan mono-oleate such as SPAN 80 or ARLACEL 80, sorbitan monosesquioleate such as SPAN 83 or ARLACEL 83, sorbitan trioleate such as SPAN 85 or ARLACEL 85, sorbitan tristearate such as S-MAZ 65K, sorbitan monotallate such as S-MAZ 90, or the like, or combinations thereof. Non-limiting examples of polyalkylene glycols include polyethylene gycols, polypropylene glycols, and combinations thereof. Non-limiting examples of polyethylene glycols for use herein include those available commercially under the tradename CARBOWAX polyethylene gycols and methoxypolyethylene glycols from Dow Chemical Company, such as CARBOWAX PEG 200, 300, 400, 600, 900, 100, 1450, 3350, 4000, or 8000, under the trademark PURACOL polyethylene glycols from BASF Corporation, such as PURACOL E 200, 300, 400, 600, 900, 1000, 1450, 3350, 4000, 6000, or 8000. Non-limiting examples of polyalkylene glycol esters include mono- or di-esters of various fatty acids, such as those available under the tradename MAPEG polyethylene glycol esters from BASF Corporation, such as MAPEG 200ML or PEG 200 Monolaureate, MAPEG 400 DO or PEG 400 Dioleate, MAPEG 400 MO or PEG 400 Mono-oleate, and MAPEG 500 DO or PEG 600 Dioleate. Non-limiting examples of copolymers of ethylene oxide and propylene oxide include various PLURONIC and PLURONIC R block copolymer surfactants such as those available under the trademark DOWFAX non-ionic surfactants, UNCON(RO) fluids and SYNALOX lubricants from DOW Chemical. Non-limiting examples of polyoxyalkylene derivatives of a sorbitan fatty acid ester include polyoxyethylene 20 sorbitan monolaurate available under the tradename TWEEN 20 or T-MAZ 20, polyoxyethylene 4 sorbitan monolaurate available under the tradename TWEEN 21, polyoxyethylene 20 sorbitan monopalmitate available under the tradename TWEEN 40, polyoxyethylene 20 sorbitan monostearate available under the tradenames TWEEN 60 and T-MAZ 60K, polyoxyethylene 20 sorbitan mono-oleate available under the tradename TWEEN 80 or T-MAZ 80, polyoxyethylene 20 tristearate available under the tradename TWEEN 65 or T-MAZ 65K, polyoxyethylene 5 sorbitan mono-oleate available under the tradename TWEEN 81 or T-MAZ 81, polyoxyethylene 20 sorbitan trioleate available under the tradename TWEEN 85 or T-MAZ 85K, and the like.

The heat transfer fluid can further comprise colloidal silica. Colloidal silica for use herein is of an average particle size of about 1 nanometer (nm) to about 200 nm, more specifically from about 1 nm to about 100 nm, and even more specifically from about 1 nm to about 40 nm. The colloidal silica is advantageous as a secondary corrosion inhibitor, and can sometimes improve the heat transfer properties of the heat transfer fluid. While not wishing to be bound by theory, it is believed that the use of silica of a particular average particle size provides improvements in heat transfer efficiency and/or heat capacity by providing a large surface area for contact with the liquid coolant.

Non-limiting examples of colloidal silica include LUDOX from DuPont or Grace Davidson, NYACOL or BINDZIL from Akzo Nobel or Eka Chemicals, SNOWTEX from Nissan Chemical. Other suppliers of suitable colloidal silica include Nalco and the like.

The colloidal silica can be present in the heat transfer fluid in an amount of 0.01 to about 10,000 ppm, more specifically of about 0.02 to about 2000 ppm, and even more specifically about 0.1 to about 1000 ppm, based on the total weight of the heat transfer fluid.

Other additional corrosion inhibitors include cyclohexanoic carboxylates derived from long chain fatty acids, as well as salts and esters thereof, and amine compounds, such as mono-, di-, and triethanolamine, morpholine, benzylamine, cyclohexylamine, dicyclohexylamine, hexylamine, 2-amino-2-methyl-1-propanol, diethylethanolamine, diethylhydroxylamine, 2-dimethylaminoethanol, dimethylamino-2-propanol, and 3-methoxypropylamine. These additional corrosion inhibitors can be added to the heat transfer fluid, with the proviso that they do not produce adverse effects. The other additional corrosion inhibitors can be present in the heat transfer fluid in an amount of 0.01 wt % to about 5 wt %, based on the total weight of the heat transfer fluid.

In certain embodiments, it can be advantageous if the heat transfer fluid comprises a tetraalkylorthosilicate ester. The tetraalkylorthosilicate ester comprises a C1-C20 alkyl group, non-limiting examples of which include tetramethylorthosilicate, tetraethylorthosilicate, and the like. The tetraalkylorthosilicate ester can be present in the heat transfer fluid in an amount of 0.01 wt % to about 5 wt %, based on the total weight of the heat transfer fluid.

The corrosion inhibiting heat transfer fluid can further comprise a non-conductive colorant that is a non-ionic or a weakly ionic species soluble or dispersible in the liquid coolant at the concentration of the colorant required to provide coloring of the heat transfer fluid.

In one embodiment, the non-conductive colorant is substantially free of functional groups that will form an ionic species due to hydrolysis in an aqueous alcohol or alkylene glycol solution. In another embodiment, the non-conductive colorant is substantially free of functional groups selected from the group consisting of carboxylate groups, sulfonate groups, phosphonate groups, quaternary amines, groups that carry a positive charge, and groups that carry a negative charge. Non-limiting examples of groups that carry a positive charge include $Na^+$, $Cu^{2+}$, —$NR_3^{3+}$ where R3 is H, C1-C20 alkyl groups or aromatic ring containing groups, $Fe^{3+}$, the like, and combinations thereof. Non-limiting examples of groups that carry a negative charge include $Cl^-$, $Br^-$, $I^-$, and the like, and combinations thereof.

Non-limiting examples of non-conductive colorants include a chromophore such as anthraquinone, triphenylmethane, diphenylmethane, azo containing compounds, diazo containing compounds, triazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, a conjugated aromatic groups, a conjugated heterocyclic group (e.g., stilbene, bis-triazenylaminostilbene, pyrazoline, and/or coumarin type molecule or a combination thereof), a conjugated carbon-carbon double bond (e.g., carotene), and a combination thereof. In one exemplary embodiment, the non-conductive colorants will comprise a diarylmethane, triarylmethane, triphenylmethane, diphenylmethane, a conjugated aromatic group, an azo group, or a combination thereof. In an advantageous embodiment, the non-conductive colorant comprises a chromophore comprising a conjugated aromatic group.

The non-conductive colorant can comprise alkyleneoxy or alkoxy groups and a chromophore such as described above. In one embodiment, the chromophore is selected from the group consisting of anthraquinone, triphenylmethane, diphenylmethane, azo containing compounds, diazo containing compounds, triazo containing compounds, compounds comprising one or more conjugated aromatic groups, one or more conjugated heterocyclic groups, and combinations thereof.

In one embodiment, non-conductive colorants can be of the formula R4{Ak[(E)nR5]m}y wherein R4 is an organic chromophore selected from the group consisting of anthraquinone, triphenylmethane, diphenylmethane, azo containing compounds, diazo containing compounds, triazo containing compounds, xanthene, acridine, indene, thiazole, compounds comprising one or more conjugated aromatic groups, one or more conjugated heterocyclic groups, or combinations thereof, A is a linking moiety and is selected from the group consisting of O, N or S, k is 0 or 1, E is selected from the group consisting of one or more C1-C8 alkyleneoxy or alkoxy groups, n is 1 to 100, m is 1 or 2, y is 1 to 5, and R5 is selected from the group consisting of H, C1-C6 alkyl or C1-C8 alkoxy groups, or combinations thereof.

In one exemplary embodiment, the non-conductive colorants are of the formula R4{Ak[(E)nR5]m}y wherein R4 is as described above, A is N or O, k is 0 or 1, E is a C2-C4 alkyleneoxy group, n is from 1 to 30, m is 1 or 2, y is 1 or 2, and R5 is H, a C1-C4 alkyl group, or a C1-C6 alkoxy group.

The non-conductive colorants can be prepared by various known methods such as those described in U.S. Pat. No. 4,284,729, U.S. Pat. No. 6,528,564 or other patents issued to Milliken & Company, Spartanburg, S.C., USA.

For example, suitable colorants can be prepared by converting a dyestuff intermediate containing a primary amino group into the corresponding polymeric compound and employing the resulting compound to produce a compound having a chromophoric group in the molecule.

In the case of azo dyestuffs, this can be accomplished by reacting a primary aromatic amine with an appropriate amount of an alkylene oxide or mixtures of alkylene oxides, such as ethylene oxide and the like, according to known procedures, and then coupling the resulting compound with a diazonium salt of an aromatic amine.

In order to prepare liquid colorants of the triarylmethane class, aromatic amines that have been reacted as stated above with an alkylene oxide are condensed with aromatic aldehydes and the resulting condensation products oxidized to form the triarylmethane liquid colorants.

Other suitable colorants can also be prepared by these and other known procedures. Colorants containing contaminating ionic species can be used if purification methods are employed. Illustrative purification and chemical separation techniques include treatment with ion exchange resins, reverse osmosis, extraction, absorption, distillation, filtration, and the like, and similar processes used to remove the ionic species and obtain a purified colorant that is electrically non-conductive.

Non-limiting examples of commercially available non-conductive colorants for use in the heat transfer fluid include LIQUITINT Red ST or other similar polymeric colorants from Milliken Chemical of Spartanburg, S.C., USA, or colorants from Chromatech of Canton, Mich., USA. Illustrative examples include the following: LIQUITINT Red ST, LIQUITINT Blue RE, LIQUITINT Red XC, LIQUITINT Patent Blue, LIQUITINT Bright Yellow, LIQUITINT Bright Orange, LIQUITINT Royal Blue, LIQUITINT Blue N-6, LIQUITINT Bright Blue, LIQUITINT Supra Blue, LIQUITINT Blue HP, LIQUITINT Blue DB, LIQUITINT Blue II, LIQUITINT Exp. Yellow 8614-6, LIQUITINT Yellow BL, LIQUITINT Yellow II, LIQUITINT Sunbeam Yellow, LIQUITINT Supra Yellow, LIQUITINT Green HMC, LIQUITINT violet, LIQUITINT Red BL, LIQUITINT Red RL, LIQUITINT Cherry Red, LIQUITINT Red II, LIQUITINT Teal, LIQUITINT Yellow LP, LIQUITINT Violet LS, LIQUITINT Crimson, LIQUITINT Aquamarine, LIQUITINT Green HMC, LIQUITINT Red HN, LIQUITINT Red ST, and combinations thereof.

In one exemplary embodiment, the non-conductive colorant is selected from the group consisting of LIQUITINT Red ST from Milliken, LIQUITINT Red XC from Chromatech, CHROMATINT Yellow 1382 from Chromatech and LIQUITINT Blue® RE from Chromatech, while in an advantageous embodiment, the non-conductive colorant is LIQUITINT Blue RE from Chromatech.

The non-conductive colorant can be present in the heat transfer fluid in an amount of 0.0001 to 0.2 wt %, based on the total weight of the heat transfer fluid. In another embodiment, the non-conductive colorant can be present in the heat transfer fluid in an amount of 0.0002 to 0.1 wt %, based on the total weight of the heat transfer fluid, while in one exemplary embodiment, the non-conductive colorant can be present in an amount of 0.0003 to 0.05 wt %, based on the total weight of the heat transfer fluid.

The heat transfer fluids can also comprise additional additives such as other colorants, wetting agents, other antifoam agents, biocides, bitterants, nonionic dispersants or combinations thereof in amounts of up to 10 wt %, based on the total weight of the heat transfer fluid.

The conductivity of the heat transfer fluid can be measured by using the test methods described in ASTM D1125, that is, "Standard Test Methods for Electrical Conductivity and Resistivity of Water" or an equivalent method. The conductivity of the heat transfer fluid disclosed herein is less than about 100 µS/cm. In one embodiment, the conductivity is less than about 70 µS/cm, while in another embodiment, the conductivity is less than about 50 µS/cm, and yet in another embodiment the conductivity is less than about 25 µS/cm.

In other embodiments, the heat transfer fluid can have an electrical conductivity of about 0.02 to about 100 µS/cm, specifically about 0.02 to about 50 µS/cm, more specifically about 0.05 to about 25 µS/cm, more specifically about 0.05 to about 10 µS/cm. In one advantageous embodiment, the heat transfer fluid has an electrical conductivity of about 0.05 to about 5 µS/cm.

The heat transfer fluid can be prepared by mixing the different components together and homogenizing the resulting mixture. Generally, the alcohol and water are advantageously mixed together first. The other components and additives are then added to the alcohol-water mixture by mixing and adequate stirring. In one embodiment, the alcohol is mixed with the other components first, excluding the water. The resulting mixture is then homogenized. Water can then be added prior to packaging and/or prior to use of the heat transfer fluid.

The heat transfer fluid can be used in a variety of assemblies. It is advantageous to use the heat transfer fluid in assemblies comprising heat transfer systems which comprise aluminum and/or magnesium, and wherein the heat transfer fluid, once introduced into the heat transfer system, is in contact with the aluminum and/or magnesium. It is also advantageous to use the heat transfer fluid in assemblies where the heat transfer fluid is exposed to an electrical current (such as in fuel cells, and the like).

The assemblies comprise internal combustion engines or alternative power sources, among others. Internal combustion engines include those that are powered by gasoline, and also those that are powered by natural gas, diesel, methanol, hydrogen, the condensation of steam, and/or the like. Non-limiting examples of alternative power sources include batteries, fuel cells, solar cells, solar panels, photovoltaic cells. Alternative power sources can include devices powered by internal combustion engines operating with a clean heat transfer system, that is, a heat transfer system that does not contribute to the concentration of ionic species in the heat transfer fluid. Such alternative power sources can be used alone or in combination, such as those employed in hybrid vehicles.

Assemblies comprising such alternative power sources include any assembly that can traditionally be powered by an internal combustion engine, such as automotive vehicles, boats, generators, lights, aircrafts, airplanes, trains, locomotives, military transport vehicles, stationary engines, and the like. The assemblies also include additional systems or devices required for the proper utilization of power sources, such as electric motors, DC/DC converters, DC/AC inverters, electric generators, and other power electronic devices, and the like.

Other exemplary heat transfer systems wherein the heat transfer fluid is exposed to an electrical current include those that are used in glass and metal manufacturing processes where a high electrical voltage/current is applied to the electrodes to keep a material such as glass or steel in a molten state. Such processes generally require a heat transfer fluid having low conductivity to cool the electrodes.

The disclosed assemblies include a power source comprising a heat transfer system in thermal communication with the alternative power source and with the heat transfer fluid. In one embodiment, the heat transfer system comprises a circulation loop defining a flow path for the heat transfer fluid. The heat transfer system can be integrated with the power source, that is, the power source can be a part of the heat transfer system. In one embodiment, the heat transfer system comprises a circulation loop defining a flow path for the heat transfer fluid, the circulation loop flowing through the power source.

Thus, in one embodiment, a heat transfer system comprises a circulation loop defining a flow path for a heat transfer fluid, and a heat transfer fluid comprising a liquid coolant, a siloxane corrosion inhibitor, and a non-conductive polydiorganosiloxane antifoam agent, wherein the conductivity of the heat transfer fluid is less than about 100 µS/cm, and wherein the heat transfer system comprises aluminum, magnesium, or a combination thereof, in intimate contact with the heat transfer fluid.

In an exemplary embodiment referred to in FIG. 1, the power source is an internal combustion engine, and the heat transfer system comprises magnesium. It will be understood that while FIG. 1 refers to an exemplary embodiment wherein the heat transfer system comprises magnesium, it is not limited thereto and can also comprise aluminum, or the like. A combination of the metals can also be used.

Thus, referring now to FIG. 1, an exemplary heat transfer system 10 comprises a heat transfer fluid reservoir 12, a pump 14, an engine 16, a heater core 18, a thermostat 20, a radiator cap 22, an overflow tank 26 and a radiator 24. The heat transfer system can further comprise an ion exchange resin 28, conduits (e.g., pipe 30), valves (not shown) and other pumps. Each component of the heat transfer system 10 can comprise magnesium. In one exemplary embodiment, at least one of the components of the heat transfer system 10 comprises magnesium and/or magnesium alloys. In another exemplary embodiment, each of the pump 14, the engine 16, the heater core 18, the thermostat 20, the radiator cap 22, the overflow tank 26, and the radiator 24 comprises magnesium. In another exemplary embodiment, one or more components comprise magnesium while one or more other components comprise aluminum.

The reservoir 12 is provided to maintain the heat transfer fluid in an environment free from undesirable contaminants when the fluid is not circulating. In one embodiment, reservoir 12 comprises plastic.

The pump 14 is provided to drive the fluid through the heat transfer system 10. Specifically, pump 14 routes fluid from the reservoir, through an engine block of the engine 16, that is, through a first set of interior passages of the engine that are disposed proximate the engine cylinder, through heater core 18, through a second set of interior passages of the engine block, and to the thermostat 20. Depending on the position of the thermostat 20, the fluid is then routed through either the radiator cap 22, the radiator 24, then to the pump 14, or directly to the pump 14. The pump 14 can be a centrifugal pump driven by a belt connected to a crankshaft of the engine 16. The pump 14 pumps heat transfer fluid through the heat transfer system 10 when the engine 16 is operating. The pump 14 can comprise a rotating component comprising an impeller and a shaft. The pump 14 can further comprise a stationary component comprising a casing, a casing cover, and bearings. In an exemplary embodiment both the rotating component of the pump and the casing component of the pump comprise magnesium. In another exemplary embodiment only the rotating component, the casing component, or subcomponents of the rotating component and casing component comprise magnesium.

The engine 16 comprises the engine block, cylinders, cylinder connecting rods, and a crankshaft. The engine block comprises internal passageways disposed therethrough. The internal passageway can be cast or machined in the engine block. The heat transfer fluid can be routed through the internal passageways of the engine to transfer heat from the engine. These passageways direct the heat transfer so that the fluid can transfer heat away from the engine to optimize engine performance.

In an exemplary embodiment the metal engine components comprise magnesium. Specifically, the engine block, the cylinders, the cylinder connecting rods, and the crankshaft comprise magnesium. In an alternative exemplary embodiment, certain engine components can comprise magnesium, while other engine components do not comprise magnesium. For example, the engine block can comprise magnesium, while the cylinder, cylinder connecting rods, and the crankshaft can comprise steel.

The heater core 18 is provided to cool the heat transfer fluid while heating a vehicle interior. The heater core 18 can comprise a series of thin flattened tubes having a high interior surface area and exterior surface area such that heat can be effectively transferred away from the heat transfer fluid. In an exemplary embodiment, the heating core 18 comprises magnesium tubes brazed together. In another exemplary embodiment the heating core can comprise tubes joined together by other joining methods or the heating core can be cast as a single unit. Air can be forced past the heater core to increase the cooling rate of the heat transfer fluid.

The thermostat 20 is provided to measure a temperature indicative of a selected heat transfer fluid temperature and selectively routes the heat transfer fluid to the radiator or to the pump. Thermostat 20 routes the heat transfer fluid to the radiator when the temperature of the heat transfer fluid is greater than or equal to the selected temperature and to the pump when the temperature of the heat transfer fluid is less than the selected temperature. The thermostat has an inlet portion, a radiator outlet portion, a radiator bypass outlet portion, and a valve portion. A single housing member can define the inlet portion, the radiator outlet portion, and the radiator bypass outlet portion. The valve portion can be disposed within the single housing member and provide selective communication between the inlet portion and both the radiator outlet portion and the radiator bypass outlet portion. When the valve is in a closed position, the thermostat routes the heat transfer fluid directly to the pump. When the valve is in the open position, the thermostat routes the heat transfer fluid through the radiator. In an exemplary embodiment, the thermostat valve portion and the thermostat housing member comprise magnesium. In another exemplary embodiment, only the housing or only the valve portion comprise magnesium.

The radiator cap 22 is provided to seal the heat transfer system and to maintain the heat transfer fluid at a selected pressure to prevent the heat transfer fluid from boiling. In an exemplary embodiment, the radiator cap 22 comprises magnesium.

The radiator 24 is provided to cool the heat transfer fluid. The radiator 24 can comprise a series of thin flattened tubes having a high interior surface area and exterior surface area such that heat can be effectively transferred from the heat transfer fluid. In an exemplary embodiment, the radiator 24 comprises magnesium tubes brazed together. In another exemplary embodiment the radiator can comprise tubes joined together by other joining methods or case as a single unit. Air can be forced past the radiator to increasing the cooling rate of the heat transfer fluid.

The optional ion exchange resin (not shown) exchanges ions with the heat transfer fluid. Specifically, the ion exchange resin removes corrosive ions from the heat transfer fluid and replaces the corrosive ions with ions that reduce the caustic properties of the heat transfer fluid. The ion exchange resin is in fluid communication with the heat transfer fluid, and with the flow path and/or circulation loop defined by the heat transfer system. In one embodiment, the heat transfer system 10 comprises an ion exchange resin. In one embodiment, the ion exchange resin is disposed between the engine and the thermostat.

In another embodiment, the ion exchange resin is disposed in other locations of the heat transfer system 10. For example, the ion exchange resin is disposed between other heat transfer system components. Further, the ion exchange resin can be disposed within the heat transfer system components, such as in the heat transfer fluid reservoir.

Non-limiting examples of ion exchange resins include anion exchange resins, cation exchange resins, mixed bed ion exchange resins, and combinations thereof. The ion exchange resin comprises a polymer matrix comprising polymers comprising functional groups paired with an exchangeable ion. The exchangeable ion is generally one or more of Na+, H+, OH−, or Cl− ions, depending on the type of ion exchange resin.

Non-limiting examples of polymers comprised in the polymer matrix include polystyrene, polystyrene and styrene copolymers, polyacrylates, aromatic substituted vinyl copolymers, polymethacrylates, phenol-formaldehyde, polyalkylamine, and the like, and combinations thereof. In one embodiment, the polymer matrix comprises polystyrene and styrene copolymers, polyacrylates, or polymethacrylates, while in one exemplary embodiment, the polymer matrix comprises styrenedivinylbenzene copolymers.

Non-limiting examples of functional groups in cation ion exchange resins include sulfonic acid groups (—SO3H), phosphonic acid groups (—PO3H), phosphinic acid groups (—PO2H), carboxylic acid groups (—COOH or —C(CH3)-COOH), and the like, and combinations thereof. In one embodiment, the functional groups in the cation exchange resin are —SO3H, —PO3H, or —COOH, while in one exemplary embodiment, the functional groups in the cation exchange resin are —SO3H.

Non-limiting examples of functional groups in anion exchange resins include quaternary ammonium groups such as benzyltrimethylammonium groups, termed type 1 resins, benzyldimethylethanolammonium groups, termed type 2 resins, trialkylbenzyl ammonium groups, also termed type 1 resins, tertiary amine functional groups, and the like. In one embodiment, the functional groups in the anion exchange resin are benzyltrimethylammonium, or dimethyl-2-hydroxyethylbenzyl ammonium, while in one exemplary embodiment the functional groups in the anion exchange resin are benzyltrimethylammonium.

The particular ion exchange resin selected is dependent upon the composition of the heat transfer fluid, and can exchange ions with any ionic species produced by the heat transfer fluid. For example, if the siloxane corrosion inhibitor, the non-conductive polydimethylsiloxane antifoam agent, the azole, or any additive in the heat transfer fluid are more likely to become negatively charged, the ion exchange resin should be a mixed bed resin, an anion exchange resin, or a combination thereof. Commercially available anion exchange resins typically comprise OH− or Cl− exchangeable ions. In one embodiment, the exchangeable ion is OH−.

Alternatively, if the siloxane corrosion inhibitor, the non-conductive polydimethylsiloxane antifoam agent, the azole, or any additive in the heat transfer fluid are likely to become positively charged, then mixed bed resins, cation exchange resins or a combination thereof should be used. Commercially available cation exchange resins typically comprise H+ or Na+ exchangeable ions. In one embodiment, the exchangeable ion is H+.

Commercially available ion exchange resins suitable for use herein are available from Rohm & Haas of Philadelphia, Pa. as AMBERLITE, AMBERJET, DUOLITE, and IMAC resins, from Bayer of Leverkusen, Germany as LEWATIT resin, from Dow Chemical of Midland, Mich. as DOWEX resin, from Mitsubishi Chemical of Tokyo, Japan as DIAION and RELITE resins, from Purolite of Bala Cynwyd, Pa. as PUROLITE resin, from Sybron of Birmingham, N.J. as IONAC resin, from Resintech of West Berlin, N.J., and the like. In one embodiment, the suitable commercially available ion exchange resin is DOWEX MR-3 LC NG Mix mixed bed resin, DOWEX MR-450 UPW mixed bed resin, IONEC NM-60 mixed bed resin, or AMBERLITE MB-150 mixed bed resin, while in one exemplary embodiment, the suitable commercially available ion exchange resin is DOWEX MR-3 LC NG Mix.

In one embodiment, the ion exchange resin is pre-treated with a corrosion inhibiting composition prior to use in the heat transfer system. The ion exchange resin is pre-treated by contacting the ion exchange resins with an aqueous corrosion inhibiting solution comprising the corrosion inhibiting composition for a selected time period. In one embodiment, the ion exchange resin is contacted with the aqueous corrosion inhibiting composition solution for a period of time sufficient to allow the corrosion inhibiting composition to exchange ions with at least about 15% of the total exchangeable ions, based on the total number of exchangeable ions in the ion exchange resin. That is, the corrosion inhibiting composition loading of the corrosion inhibiting composition treated ion exchange resin should be at least about 15% of the exchange capacity of the ion exchange resin. In another embodiment, the period of contact is sufficient to allow the corrosion inhibiting compositions to exchange ions with at least about 50% of the total exchangeable ions, based on the total number of exchangeable ions in the ion exchange resin. In one exemplary embodiment, the period of contact is sufficient to allow the corrosion inhibiting composition to exchange ions with at least about 75% of the total exchangeable ions, based on the total number of exchangeable ions in the ion exchange resin. In another exemplary embodiment, the period of contact is sufficient to allow the corrosion inhibiting composition loading of the corrosion inhibiting composition treated ion exchange resin to be an amount of about 15 to about 99% of the total exchange capacity of the ion exchange resin or from about 15 to about 99% of the total exchangeable ions, based on the total number of exchangeable ions in the ion exchange resin.

In one exemplary embodiment, the resultant corrosion inhibiting composition treated ion exchange resins will be cleansed with de-ionized water and/or the heat transfer fluid to minimize the chance for accidental introduction of impurities.

In one embodiment, ion exchange resins in Na+ or Cl− forms are used only if the treatment with the aqueous corrosion inhibiting solution results in the removal of substantially all of the Na+ or Cl− ions from the ion exchange resin. In one embodiment, ion exchange resins in Na+ or Cl− forms are used if the treatment with the aqueous corrosion inhibiting solution results in the corrosion inhibiting composition loading of the corrosion inhibiting composition treated ion exchange resin being at least about 80% of the total exchangeable ions.

The corrosion inhibiting compositions for treating the ion exchange resin comprises a siloxane corrosion inhibitor, an azole, or a combination thereof. Suitable siloxane corrosion inhibitors and azoles are those described above. The corrosion inhibiting compositions are weakly ionic and therefore, when in contact with the heat transfer fluid, maintain the low conductivity of the heat transfer fluid.

The amount of corrosion inhibiting composition released from the resin depends on the level of corrosive ions in the heat transfer fluid. The corrosion inhibiting composition is advantageous since an increase in the amount of corrosive ions in the heat transfer fluid produces an increase in the amount of corrosion inhibiting composition from the resin being released into the heat transfer fluid due to the ion exchange mechanism. The increase in the amount of corrosion inhibiting composition concentration in the heat transfer fluid will lead to a reduction in the corrosion rate. Another advantage of the heat transfer system is that the presence of the ion exchange rein, and advantageously, the mixed bed ion exchange resin, will also maintain low conductivity in the heat transfer fluids in the system.

In one embodiment, acidic aqueous corrosion inhibiting solutions suitable for treating the ion exchange resin have a pKa value of equal to or greater than about 5 at 25° C., specifically from about 5 to about 14. In another embodiment, basic aqueous corrosion inhibiting solutions suitable for treating the ion exchange resin have a pKb value of equal to or greater than about 5 at 25° C., specifically from about 5 to about 14.

Further, the ion exchange resin can be treated with other additives such as colorants, wetting agents, antifoam agents, biocides, and nonionic dispersants, with the proviso that the other additives do not substantially increase the overall electrical conductivity of the heat transfer fluid when the additives are added to the heat transfer fluid.

In one embodiment, the ion exchange resin will be treated with a non-conductive polydimethylsiloxane emulsion based antifoam. Suitable polydimethylsiloxane emulsion based antifoams include those described above.

Figure 2:
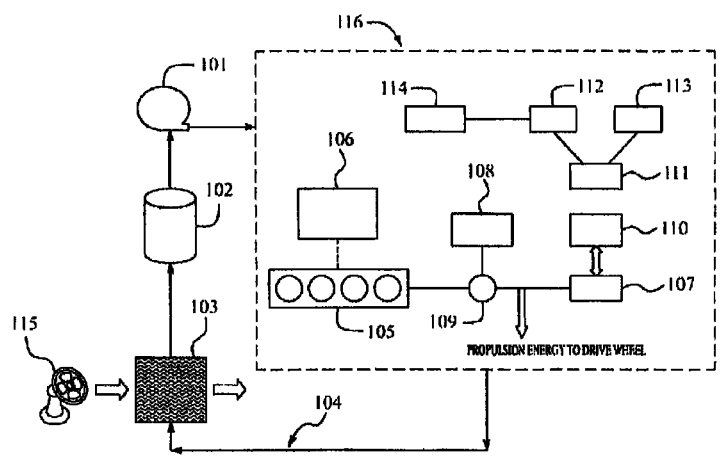
FIG. 2 is a schematic diagram of another embodiment of the heat transfer system.

In another exemplary embodiment referred to in FIG. 2, an assembly comprises a power source that can be an internal combustion engine, or advantageously, an alternative power source, specifically a solar cell or fuel cell. The heat transfer system comprises magnesium. The assembly can also comprise a regenerative braking system. It will be understood that while FIG. 2 refers to an exemplary embodiment wherein the heat transfer system comprises magnesium or aluminum, any other susceptible metal can be used therein.

Thus, referring now to FIG. 2, an exemplary heat transfer system 116 comprises an internal combustion engine 105, or fuel cells 105 or solar cells 105 as the primary power source 107. It also comprises a rechargeable secondary battery 112 or an optional ultra-capacitor 113 that can be charged via the assembly's regenerative braking system. The battery 112 and/or the ultra-capacitor 113 can act as secondary power sources. The assembly can further comprise power electronic devices, such as DC/DC converters 110, DC/AC inverters 110, generators 108, power splitting devices 109, and/or voltage boost converters 111, and the like. In addition, the assembly can contain fuel cell or solar cell "balance of plant" subsystems 106. These can be air compressors, pumps, power regulators, and the like. The assembly also comprises HAVC systems 114, such as, air-conditioning system for the climate control of assembly interior space. The heat transfer system 116 further comprises a pump 101, heat transfer fluid flow path 104, heat transfer fluid tank 102, and a radiator or heat exchanger 103, and a fan 115. The fan can be substituted by an external cooling source, such as a different (or isolated) cooling system with its own cooling media. An ion exchange resin (not shown) can also be present, and is as described above.

In one embodiment, the alternative power source is a fuel cell. The fuel cell is in thermal communication with the heat transfer systems and fluids. In one embodiment, the electrical conductivity of the heat transfer fluids is less than about 10 μS/cm. In an exemplary embodiment comprising a fuel cell, the heat transfer fluid comprises an electrical conductivity of about 0.02 to about 10 μS/cm. In one advantageous embodiment, the heat transfer fluid comprises an electrical conductivity of about 0.05 to about 5 μS/cm.

The heat transfer fluid can be used in a number of different types of fuel cells comprising an electrode assembly comprising an anode, a cathode, and an electrolyte, and a heat transfer fluid in thermal communication with the electrode assembly or fuel cell. In one embodiment the heat transfer fluid can be contained or flow in channel or flow path defined by a circulation loop or heat transfer fluid flow channel in thermal communication with the fuel cell.

Non-limiting examples of fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the heat transfer fluid is used in PEM and AFC fuel cells.

The invention is further illustrated by the following non-limiting examples.

Examples 1-14

Table 1 illustrates the composition of heat transfer fluids, represented by Fn, with n being the number of the fluid.

TABLE 1

| Fluid (Fn) | Composition |
|---|---|
| F1 | 50 wt % conventional coolant comprising ionic corrosion inhibitors. The concentrate of this coolant contains greater than 94 wt % ethylene glycol, 0.1 to 0.3 wt % tolyltriazole, 0.2 to 0.5 wt % nitrate, up to 0.1 wt % molybdate, 0.1 to 2.0 wt % borax, 0.1 to 0.5 wt % phosphoric acid, 0.1 to 0.5 wt % of silicate, 0.4 to 2.0 wt % of NaOH or KOH or their mixtures, very small amounts (e.g., less than 0.1 wt %) of antifoams and colorants. |
| F2 | 50 wt % monoethylene glycol, 0.116 wt % siloxane corrosion inhibitor (i.e., Silwet L-7657 from GE Silicone; 116 ppm benzotriazole, 350 ppm non-conductive polydimethylsiloxane antifoam agent (i.e., PC-5450 NF antifoam), the balance deionized water. |
| F3 | 50 wt % monoethylene glycol, the balance deionized water. |
| F4 | 43 wt % mixture of ethylene glycol and 1,2-propylene glycol (~80 wt % of the mixture is ethylene glycol and the remaining ~20 wt % is 1,2-propylene glycol), 400 ppm siloxane corrosion inhibitor, or Silwet L-7657, 100 ppm benzotriazole, 800 ppm non-conductive polydimethylsiloxane antifoam agent, or PC-5450 NF antifoam, the balance deionized water. |
| F5 | 50 wt % monoethylene glycol, 400 ppm siloxane based corrosion inhibitor Silwet L-7657; 100 ppm benzotriazole, 800 ppm non-conductive polydimethylsiloxane antifoam agent PC-5450 NF, the balance deionized water. |
| F6 | 50 wt % monoethylene glycol, 400 ppm siloxane corrosion inhibitor Silwet L-7657, 100 ppm benzotriazole, 800 ppm non-conductive polydimethylsiloxane antifoam agent, i.e., PC-5450 NF, 100 ppm sorbitan fatty acid esters, i.e., Span 20, available from Aldrich, 100 ppm polyethylene glycol corrosion inhibiting surfactant, i.e., Carbowax 400, available from from Dow Chemicals, the balance deionized water. |
| F7 | 50 volume % (vol %) Valvoline ZEREX G-05 (hybrid) coolant, the balance deionized water. Valvoline Zerex G-05 coolant concentrate contains greater than 94 wt % ethylene glycol, 0.1 to 0.4 wt % nitrate, 0.1 to 0.4 wt % nitrite, 0.5 to 2.5 wt % borax, 0.05 to 0.15 wt % benzotriazole, 0.1 to 0.2 wt % silicate, 1 to 3 wt % benzoic acid, 0.4 to 2.0 wt % NaOH or KOH or their mixture, and very small amounts (e.g., less than 0.1 wt %) of antifoams and colorants and up to 0.5 wt % of a polymer dispersant. |
| F8 | 50 vol % Toyota LONG LIFE red coolant, the balance deionized water. The coolant concentrate contains greater than 94 wt % ethylene glycol, 3 to 5 wt % benzoic acid, 0.1 to 0.3 wt % benzotriazole, 0.1 to 0.4 wt % mecaptobenzothiazole, 0.5 to 1 wt % phosphoric acid, 0.5 to 1 wt % molybdate, 0.1 to 0.5 wt % nitrate, 0.5-5 wt % NaOH or KOH or their mixtures, and very small amounts (e.g., less than 0.1 wt %) of antifoams and colorants, as well as very small amount of other coolant additives such as a phosphonate scale inhibitor and hardness ions. |
| F9 | 50 volume % Texaco HD coolant, the balance deionized water. The coolant concentrate contains greater than 94 wt % ethylene glycol, 2 to 4 wt % ethyl hexanoic acid, 0.1 to 0.4 wt % sebacic acid, 0.2 to 0.5 wt % tolytriazole, 0.1 to 0.4 wt % sodium nitrite, 0.2 to 1 wt % molybdate, 0.5 to 5 wt % of KOH or NaOH or their mixtures, and very small amounts (e.g., less than 0.1 wt %) of antifoams, and colorants. |
| F10 | 50 wt % monoethylene glycol, 400 ppm siloxane based surfactant (i.e., Silwet L-7657), 100 ppm benzotriazole, 800 ppm polydimethylsiloxane emulsion based antifoam (i.e., PC-5450 NF), 200 ppm sorbitan fatty acid esters (i.e., Span-20), and 200 ppm polyethylene glycol corrosion inhibiting surfactant (i.e., Carbowax 400). |

Table 2 illustrates the corrosion results obtained in a galvanic couple where a MRI202S magnesium alloy anode is galvanically coupled to a copper cathode. A 0.5 square centimeter magnesium alloy coupon is placed in a heat transfer fluid along with a 1.1 square centimeter copper alloy coupon. The coupons are placed 1 centimeter apart and the temperature is maintained at 88° C. Conductivity, average corrosion rate, and corrosion loss level results of the magnesium alloys in solution are listed below. In each example, magnesium corrosion loss was measured over a total time of 12,000 seconds. En refers to Example, wherein n is the number of the example.

The test solutions used are described in Table 1. In the galvanic couple experiment, the galvanic couple current density is measured as a function of time. In general, the current density is varied over time. The total charge in Table 2 represents the total amount of the galvanic corrosion occurring during a test. Average corrosion rate and corrosion loss data are calculated by using the total charge and total time of the test according to the Faraday law and expected corrosion anodic reaction, i.e., $Mg \rightarrow Mg^{2+} + 2e^-$.

Final galvanic couple current density represents the instant galvanic corrosion rate of the magnesium alloy at the end of the test. In general, if the average corrosion rate and the corrosion loss value is lower for a given inhibitive coolant formulation, it indicates that the coolant formulation is providing a better corrosion protection than a coolant formulation that yields a higher corrosion rate.

In Examples 3-8, an ion exchange resin is also placed in the solution. Resin 1 comprises 3 grams of DOWEX MR-450 UPW. Resin 2 comprises 3.5 grams of Amberjet UP6040 ion exchange resin, treated with an aqueous benzotriazole solution. Resin 3 comprises 7.0 grams of DOWEX MR-450 UPW and 1.75 grams of untreated Amberjet UP6040. Resin 4 comprises 7.0 grams of DOWEX MR-450 UPW treated with an aqueous benzotriazole solution. Resin 5 comprises 14.35 grams of Dowex MR-450 UPW treated with an aqueous benzotriazole solution and 3.5 grams of untreated DOWEX MR-450 UPW. The dry resin is the resin refers to the resin as received from the supplier. The wet resin refers to the resin treated with an aqueous benzotriazole solution. The resin after treatment was recovered from the treatment container, i.e., a pyrex beaker, using a stainless steel spatula. The resin was then transferred to a clean and inert ion exchange resin filter bag made of Nylon. The excess amount of water was drained by the force of gravity. After the excess amount of water was removed from the treated resin, the resin was stored in a clean glass bottle for later use. The benzotriazole pretreatment of the resin was typically conducted by adding 10 g of Dowex MR-450 UPW mixed bed ion exchange resin into 1 liter of deionized water. Before adding the ion exchange resin, 1200 mg/L benzotriazole was dissolved in the 1 liter of the deionized water. Under constant magnetic stirring via the use of a Teflon coated magnet stirring bar and a magnetic stirrer, the resin and the benzotriazole aqueous solution were allowed to react for 22 hours at room temperature. During this treatment process, benzotriazole is exchanged with H+ and OH− groups in the mixed bed ion exchange resin so that the resin is saturated with benzotriazole at all the exchangeable sites. The mixed bed ion exchange resin obtained after the treatment is termed the benzotriazole treated resin.

As can be seen from Tables 2 and 3, the heat transfer fluids lacking the siloxane corrosion inhibitor and non-conductive polydimethylsiloxane antifoam agent has an average corrosion loss rate of greater than 0.3 and up to as high as about 215 μm/day for E10. The examples with a siloxane corrosion inhibitor, an azole and a non-conductive polydimethylsiloxane antifoam agent have a magnesium average corrosion loss rates of less than 2.1 μm/day. It can also be seen that the benzotriazole-treated ion exchange resins can be used to keep the conductivity similar to when untreated ion exchange resins are used, and the same time allow the presence of benzotriazole residual concentration in the heat transfer fluid to provide the desirable corrosion protection for copper based alloys and other metals in the heat transfer system.

TABLE 2

| Example (En) | E1 | E2 | E3 | E4 | E5 | E6 | E7 | E8 |
|---|---|---|---|---|---|---|---|---|
| Fluid (Fn) | F1 | F2 | F2 | F2 | F2 | F3 | F4 | F5 |
| Ion Exchange Resin | None | None | Resin 1 | Resin 2 | Resin 3 | Resin 1 | Resin 4 | Resin 5 |
| Total Charge (mC/cm$^2$) | 3704 | 237.6 | 16.44 | 56.86 | 18.72 | 14.87 | 72.45 | 24.73 |
| Final Current Density at the end of the galvanic couple test (μA/cm$^2$) | 210.8 | 25.51 | 1.226 | 4.238 | 1.432 | 1.073 | 5.827 | 1.884 |
| Average corrosion Rate (μm/day) | 19.322 | 1.239 | 0.086 | 0.291 | 0.098 | 0.078 | 0.378 | 0.129 |
| Corrosion Loss (mg/week/cm$^2$) | 23.508 | 1.508 | 0.104 | 0.355 | 0.119 | 0.094 | 0.460 | 0.157 |
| Conductivity Initial/Final (μS/cm) | N.D. | 1.09/4.97 | 1.16/0.16 | 0.78/N.D. | 0.14/0.15 | 0.29/0.19 | 0.29/0.41 | 0.98/0.17 |
| Final BZT (ppm) | N.D. | N.D. | 0 | N.D. | 12 | 0 | 157 | 27 |

N.D. = not detectable

Table 3 illustrates the test results obtained in galvanic couple corrosion experiments where a MRI2028 magnesium alloy anode is galvanically coupled to a mild steel C1018 cathode. A 0.5 square centimeter magnesium alloy coupon is placed in a heat transfer fluid along with a 1.1 square centimeter steel coupon. The coupons are placed 1 centimeter apart and the temperature is maintained at 88° C. Conductivity, average corrosion rate, and corrosion loss level results of the magnesium alloys in solution are listed below. In each example, magnesium corrosion loss was measured over a total time of 12,000 seconds.

In Examples 9 and 14 an ion exchange resin is also placed in the solution. Resin 6 comprises 10 grams of MR-450 UPW treated with an aqueous benzotriazole solution and 3 grams of MR-450UPW. Resin 7 comprises 10 grams of MR-450 UPW treated with an aqueous benzotriazole solution and 3.7 grams of MR-450UPW.

Examples 15-26

Tables 5 and 6 illustrate the test results obtained in galvanic couple corrosion tests where galvanic couples C1-C5 of Table 4 were used. These galvanic couples are exemplary magnesium-based compositions for use in automotive magnesium-based heat transfer systems, among others. The mass loss was determined according to a modified ASTM-D1384 procedure. The ASTM-D1384 test was modified by using different arrangement of metal coupons as described in Table 4.

TABLE 4

| | |
|---|---|
| C1 | Mg AS-21x (coupled to Brass via an Al 6061 spacer) |
| C2 | Mg AS-21x (coupled to SAE329 cast Al via an Al 6061 spacer) |
| C3 | Cast Aluminum SAE329 (coupled to Mg via Al 6061 spacer) |

TABLE 3

| Example (En) | E9 | E10 | E11 | E12 | E13 | E14 |
|---|---|---|---|---|---|---|
| Fluid (Fn) | F6 | F7 | F8 | F1 | F9 | F10 |
| Ion Exchange Resin | Resin 6 | None | None | None | None | Resin 7 |
| Total Charge (mC/cm$^2$) | 40.3 | 41210 | 513.1 | 58.34 | 13280 | 19.26 |
| Current Density (μA/cm$^2$) | 3.32 | 2640 | 35.84 | 3.657 | 982.1 | 1.33 |
| Total Time (sec) | 1200 | 1200 | 11333 | 1200 | 1200 | 1200 |
| Av corr Rate (μm/day) | 0.210 | 214.977 | 2.834 | 0.304 | 69.277 | 0.100 |
| Corr Loss (mg/week/cm$^2$) | 0.256 | 261.542 | 3.448 | 0.370 | 84.284 | 0.122 |
| Conductivity Initial/Final (μS/cm) | 1.03/0.20 | 6770/6110 | 10550/9230 | 3510/2890 | 6970/6020 | 1.05/0.14 |
| Final BZT (ppm) | 39 | N.D. | N.D. | N.D. | N.D. | N.D. |

TABLE 4-continued

| | |
|---|---|
| C4 | Aluminum 3003 |
| C5 | Mg AS-21x |

TABLE 5

| Example (En) | E15 | E16 | E17 | E18 | E19 | E20 |
|---|---|---|---|---|---|---|
| Couple used (Cn) | C1 | C2 | C3 | C4 | C5 | C6 |
| Mass Loss (mg/cm$^2$/week) | 2.5 | 34.1 | 22.2 | −1.7* | 0.8 | 16.8 |
| Total Mass Loss (mg/sample) | 0.046 | 0.573 | 0.373 | −0.029* | 0.015 | 0.282 |
| Heat Transfer Fluid | 60 wt % monoethylene glycol, 250 mg/L benzotriazole, and 0.1 wt % anthranilamide. | | | | | |

*Indicates a mass gain

TABLE 6

| Example (En) | E21 | E22 | E23 | E24 | E25 | E26 |
|---|---|---|---|---|---|---|
| Composition (Cn) | C1 | C2 | C3 | C4 | C5 | C6 |
| Mass Loss (mg/cm$^2$/week) | 0.6 | 19.1 | 19.0 | −0.6* | 0.5 | 8.6 |
| Total Mass Loss (mg/sample) | 0.011 | 0.321 | 0.319 | −0.010* | 0.009 | 0.144 |
| Heat Transfer Fluid | 60 wt % monoethylene glycol, 400 mg/L SILWET L-7657, 800 mg/L non-conductive polydimethyl-siloxane antifoam agent, 100 mg/L benzotriazole. | | | | | |

*Indicates a mass gain

As can be seen from Tables 5 and 6, the metals galvanically coupled through heat transfer fluids that comprise a siloxane corrosion inhibitor, and a non-conductive polydimethylsiloxane antifoam agent (Table 6) exhibit substantially less weight loss due to corrosion than metals galvanically coupled through heat transfer fluids which lack the siloxane corrosion inhibitor, and a non-conductive polydimethylsiloxane antifoam agent (Table 5).

Examples 27-34

The following examples illustrate the ability of the ion exchange resins to reduce the conductivity of a heat transfer fluid.

Table 7 illustrates the results for Examples 27 and 28. 10 g of the resin was first immersed in 1000 g of a 50 wt % ethylene glycol aqueous solution comprising 1200 ppm benzotriazole, and stirred for 22 hours. 1 g of the resulting pretreated resin was then immersed in 100 g of a 50:50 ethyleneglycol:deionized water solution comprising 30 ppm sodium formate and 30 ppm sodium acetate and stirred. Example 27 comprises a UP6040 resin and Example 28 comprises a DOWEX MR-3 LC NG Mix resin.

TABLE 7

| | Conductivity (μS/cm) | |
|---|---|---|
| Time (min) | E27 | E28 |
| 0 | 25.8 | 25.9 |
| 20 | 16.18 | 16.98 |
| 40 | 9.13 | 10.76 |
| 60 | 5.87 | 7.33 |
| 103 | 2.21 | 3.22 |
| 150 | 0.72 | 1.17 |
| 200 | 0.45 | 0.57 |
| 235 | 0.39 | 0.47 |

Table 8 illustrates the results for Example 29. 9.7 g of the resin was first immersed in 1000 g of a 50 wt % ethylene glycol aqueous solution comprising 1300 ppm tolyltriazole, and stirred for 22 hours. 1 g of the resulting pretreated resin was then immersed in 100 g of a 50:50 ethyleneglycol:deionized water solution comprising 30 ppm sodium formate and 30 ppm sodium acetate and stirred. Example 29 comprises a DOWEX MR-3 LC NG Mix Resin.

TABLE 8

| | Conductivity (μS/cm) |
|---|---|
| Time (min) | E29 |
| 0 | 28.3 |
| 20 | 18.32 |
| 40 | 12.39 |
| 60 | 7.59 |
| 90 | 5.31 |
| 120 | 3.11 |
| 150 | 1.87 |
| 220 | 0.85 |
| 240 | 0.55 |

Table 9 illustrates the results for Examples 30-32. Example 30 was a blank resin conductivity test. In Example 29, 10 g of MTO-DOWEX MR-3 LC NG Mix resin were pretreated by immersing in 250 g of a 50 wt % ethylene glycol aqueous solution comprising 1200 ppm benzotriazole. In Example 30, 10 g of MTO-DOWEX MR-3 LC NG Mix resin were pretreated by immersing in 500 g of a 50 wt % ethylene glycol aqueous solution comprising 1200 ppm benzotriazole. 1 g of the treated resin was immersed in 100 g of a 50 wt % ethylene glycol solution comprising 30 ppm NaCl and stirred.

TABLE 9

| E30 | | E31 | | E32 | |
|---|---|---|---|---|---|
| Time (min) | Conductivity (μS/cm) | Time (min) | Conductivity (μS/cm) | Time (min) | Conductivity (μS/cm) |
| 0 | 36.9 | 0 | 37.3 | 0 | 38.2 |
| 20 | 25.9 | 20 | 22.2 | 20 | 26.6 |
| 40 | 15.37 | 45 | 9.18 | 40 | 16.6 |
| 60 | 8.99 | 56 | 6.57 | 65 | 7.77 |
| 80 | 4.84 | 75 | 3.15 | 85 | 5.09 |
| 105 | 2.19 | 130 | 0.61 | 105 | 2.81 |
| 127 | 1.09 | 181 | 0.15 | 120 | 2 |
| 180 | 0.18 | 200 | 0.11 | 140 | 1.3 |
| 240 | 0.08 | 240 | 0.08 | 190 | 0.38 |
| | | | | 240 | 0.16 |

Table 10 illustrates the results for Examples 33-35. For Example 33, 10 g of MTO-DOWEX MR-3 LC NG Mix resin were pretreated by immersing in 750 g of a 50 wt % ethylene glycol aqueous solution comprising 1200 ppm benzotriazole. For Example 234, 10 g of MTO-DOWEX MR-3 LC NG Mix resin were pretreated by immersing in 1000 g of a 50 wt % ethylene glycol aqueous solution comprising 1200 ppm benzotriazole. For Example 35, 10 g of MTO-DOWEX MR-3 LC NG Mix resin were pretreated by immersing in 1000 g of a 50 wt % ethylene glycol aqueous solution comprising 1300 ppm tolyltriazole. 1 g of the treated resin was immersed in 100 g of a 50 wt % ethylene glycol solution comprising 30 ppm NaCl and stirred.

TABLE 10

| E33 | | E34 | | E35 | |
|---|---|---|---|---|---|
| Time (min) | Conductivity (µS/cm) | Time (min) | Conductivity (µS/cm) | Time (min) | Conductivity (µS/cm) |
| 0 | 35.8 | 0 | 39.4 | 0 | 38.7 |
| 20 | 20.0 | 25 | 17.09 | 20 | 25.1 |
| 40 | 12.42 | 45 | 11.1 | 40 | 18.16 |
| 60 | 8.77 | 80 | 4.39 | 60 | 10.89 |
| 103 | 2.95 | 105 | 2.21 | 90 | 6.80 |
| 150 | 0.68 | 130 | 1.24 | 120 | 3.10 |
| 200 | 0.25 | 160 | 0.59 | 150 | 1.53 |
| 235 | 0.20 | 185 | 0.4 | 220 | 0.55 |
| | | 215 | 0.33 | 240 | 0.34 |
| | | 236 | 0.31 | | |
| Residual benzotriazole | 14 ppm | | 102 ppm | | 130 ppm |

It can be seen from the data in Tables 7-10 that benzotriazole and tolyltriazole treated resins are effective at removing undesirable ionic impurities such as Na+, Cl−, formate, and acetate and thus reducing the conductivity of the thermal exchange fluid while keeping the conductivity at a low level. The benzotriazole or tolyltriazole treated ion exchange resin can also leave a desirable residual amount of the triazole in the heat transfer fluid as can be seen in Examples 33-35, and thus maintaining effective corrosion protection for metals in the heat transfer system.

This written description uses examples and figures to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety unless otherwise indicated. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Further, disclosing a range is specifically disclosing all ranges formed from any pair of any upper range limit and any lower range limit within this range, regardless of whether ranges are separately disclosed. It is not intended that the scope of the invention be limited to the specific values recited when defining a range.

The use of the terms "a", "an", "the", and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

The modifier "about" used in connection with a quantity is inclusive of the stated value and has the meaning dictated by the context (e.g., it includes the degree of error associated with measurement of the particular quantity).

Certain compounds are described herein using a general formula that includes variables such as, but not limited to, R1, R2, R3, X, Y, and the like. Unless otherwise specified, each variable within such a formula is defined independently of other variables.

The term "substituted" as used herein means that any one or more hydrogen atoms on the designated atom or group is replaced with a selection from the indicated group, provided that the designated atom's normal valence is not exceeded.

As used herein, the term "alkyl" includes both branched and straight chain saturated aliphatic hydrocarbon groups, having the specified number of carbon atoms. The term C1-C7 alkyl as used herein indicates an alkyl group having from 1 to about 7 carbon atoms. When C0-Cp alkyl is used herein in conjunction with another group, for example, heterocycloalkyl (C0-C2 alkyl), the indicated group, in this case heterocycloalkyl, is either directly bound by a single covalent bond (C0), or attached by an alkyl chain having the specified number of carbon atoms, in this case from 1 to p carbon atoms. Examples of alkyl include, but are not limited to, methyl, ethyl, n-propyl, isopropyl, n-butyl, 3-methylbutyl, t-butyl, n-pentyl, and sec-pentyl.

The term "non-conductive" as used herein relates to a species that produces a conductivity increase of less than about 10 µS/cm when introduced into a standard solution of deionized water, at a maximum concentration of no more than 0.2% by weight, based on the total weight of the standard solution.

"Substantially free of" as used herein refers to an amount that is not in excess of an amount that will lead to the conductivity of the heat transfer fluid to increase by more than 10 µS/cm.

"Alternative power sources" as used herein refers to power source technologies that provide improvements in energy efficiency, environmental concerns, waste production, and management issues, natural resource management, and the like.

"Metal" as used herein refers to the element metal, wherein "metal alloy" or "metallic alloy" refers to the metal in combination with one or more other metals. For example, magnesium refers to the element magnesium, whereas a magnesium alloy refers to a combination of magnesium with one or more other metals. Thus, a magnesium alloy comprises magnesium, and a system comprising magnesium can comprise either elemental magnesium alone, a magnesium alloy, or a combination of elemental magnesium and a magnesium alloy.

"High conductivity" as used herein refers to a conductivity of greater than 100 □S/cm.

We claim:

1. A heat transfer system, comprising: a circulation loop defining a flow path for a heat transfer fluid; and a heat transfer fluid, comprising: a liquid coolant; a non-conductive colorant, wherein the non-conductive colorant is substantially free of functional groups selected from the group consisting of positively charged groups and negatively charged groups; a siloxane corrosion inhibitor of formula $R_3$—Si—[O—Si(R)$_2$]$_x$—OSiR$_3$, wherein R is independently an alkyl group or a polyalkylene oxide copolymer of 1 to 200 carbons, x is from 0 to 100, and further wherein at least one alkyl group and at least one polyalkylene oxide copolymer are present; and a non-conductive emulsion-based polydiorganosiloxane antifoam agent; wherein the conductivity of the heat transfer fluid is less than 100 µS/cm; and wherein the heat transfer system comprises aluminum, magnesium, or a combination thereof, in intimate contact with the heat transfer fluid.

2. The heat transfer system of claim 1, wherein the conductivity of the heat transfer fluid is about 0.02 to about 5 µS/cm.

3. The heat transfer system of claim 1, wherein the liquid coolant comprises an alcohol, water, or a combination thereof.

4. The heat transfer system of claim 3, wherein the alcohol comprises methanol, ethanol, propanol, butanol, furfurol, tetrahydrofurfurol, ethoxylated furfurol, an alkoxy alkanol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylol propane, or a combination thereof.

5. The heat transfer system of claim 1, wherein the heat transfer fluid further comprises an azole comprising a pyrrole, a pyrazole, an imidazole, a triazole, a thiazole, a tetrazole, or a combination thereof, according to formulas (I)-(IV):

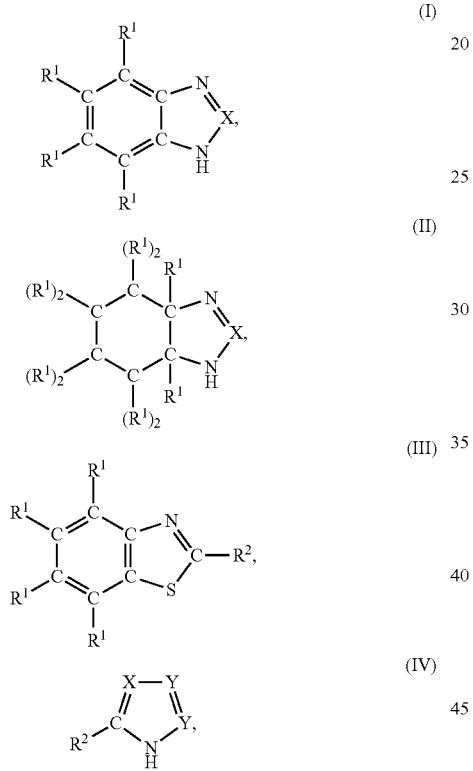

wherein $R^1$ and $R^2$ are independently a hydrogen atom, a halogen atom such, a $C_{1-20}$ alkyl or cycloalkyl group, $SR^3$, $OR^3$, or $NR^3{}_2$, wherein $R^3$ is independently a hydrogen atom, a halogen atom, or a $C_{1-20}$ alkyl or cycloalkyl group, X is independently N or $CR^2$, and Y is independently N or $CR^1$.

6. The heat transfer system of claim 1, wherein the heat transfer fluid further comprises a non-ionic corrosion inhibitor, a tetraalkylorthosilicate ester, another non-conductive colorant, a wetting agent, a biocide, a bitterant, a non-ionic dispersant, or a combination thereof.

7. The heat transfer system of claim 1, further comprising an ion exchange resin in fluid communication with the heat transfer fluid.

8. The heat transfer system of claim 7, wherein the ion exchange resin is pre-treated with a corrosion inhibiting composition comprising a siloxane corrosion inhibitor, an azole, or a combination thereof.

9. The heat transfer system of claim 1, in the form of an internal combustion engine, a fuel cell, a battery, a solar cell, a solar panel, a photovoltaic cell, or a combination thereof.

10. The heat transfer system of claim 1, wherein the negatively charged group is selected from the group consisting of carboxylate groups, sulfonate groups, and phosphonate groups.

11. The heat transfer system of claim 1 further comprising an ion exchange resin.

12. The heat transfer system of claim 11, wherein the ion exchange resin is disposed within a heat transfer fluid reservoir.

13. The heat transfer system of claim 11, wherein the ion exchange resin is pre-treated with a corrosion inhibiting composition.

14. The heat transfer system of claim 13, wherein the corrosion inhibiting composition comprises a siloxane corrosion inhibitor, an azole, or a combination thereof.

15. A heat transfer method, comprising: contacting a heat transfer system with a heat transfer fluid; wherein the heat transfer system comprises:
a circulation loop defining a flow path for the heat transfer fluid; and
aluminum, magnesium, or a combination thereof;
wherein the heat transfer fluid comprises:
a liquid coolant;
a siloxane corrosion inhibitor of formula $R_3$—Si—[O—Si$(R)_2]_x$—OSiR$_3$, wherein R is independently an alkyl group or a polyalkylene oxide copolymer of 1 to 200 carbons, x is from 0 to 100, and further wherein at least one alkyl group and at least one polyalkylene oxide copolymer are present;
a non-conductive colorant, wherein the non-conductive colorant is substantially free of functional groups selected from the group consisting of positively charged groups and negatively charged groups; and
a non-conductive emulsion-based polydiorganosiloxane antifoam agent;
wherein the conductivity of the heat transfer fluid is less than 100 μS/cm; and wherein the aluminum, magnesium, or combination thereof is in intimate contact with the heat transfer fluid.

16. The heat transfer system of claim 15, wherein the positively charged group is a quaternary amine.

17. The heat transfer system of claim 15, wherein the negatively charged group is selected from the group consisting of carboxylate groups, sulfonate groups, and phosphonate groups.

18. The heat transfer system of claim 1, wherein the positively charged group is a quaternary amine.

* * * * *